June 30, 1931.  G. H. TABER  1,812,502
BRAKE RELEASE DEVICE
Filed Aug. 16, 1928  3 Sheets-Sheet 1
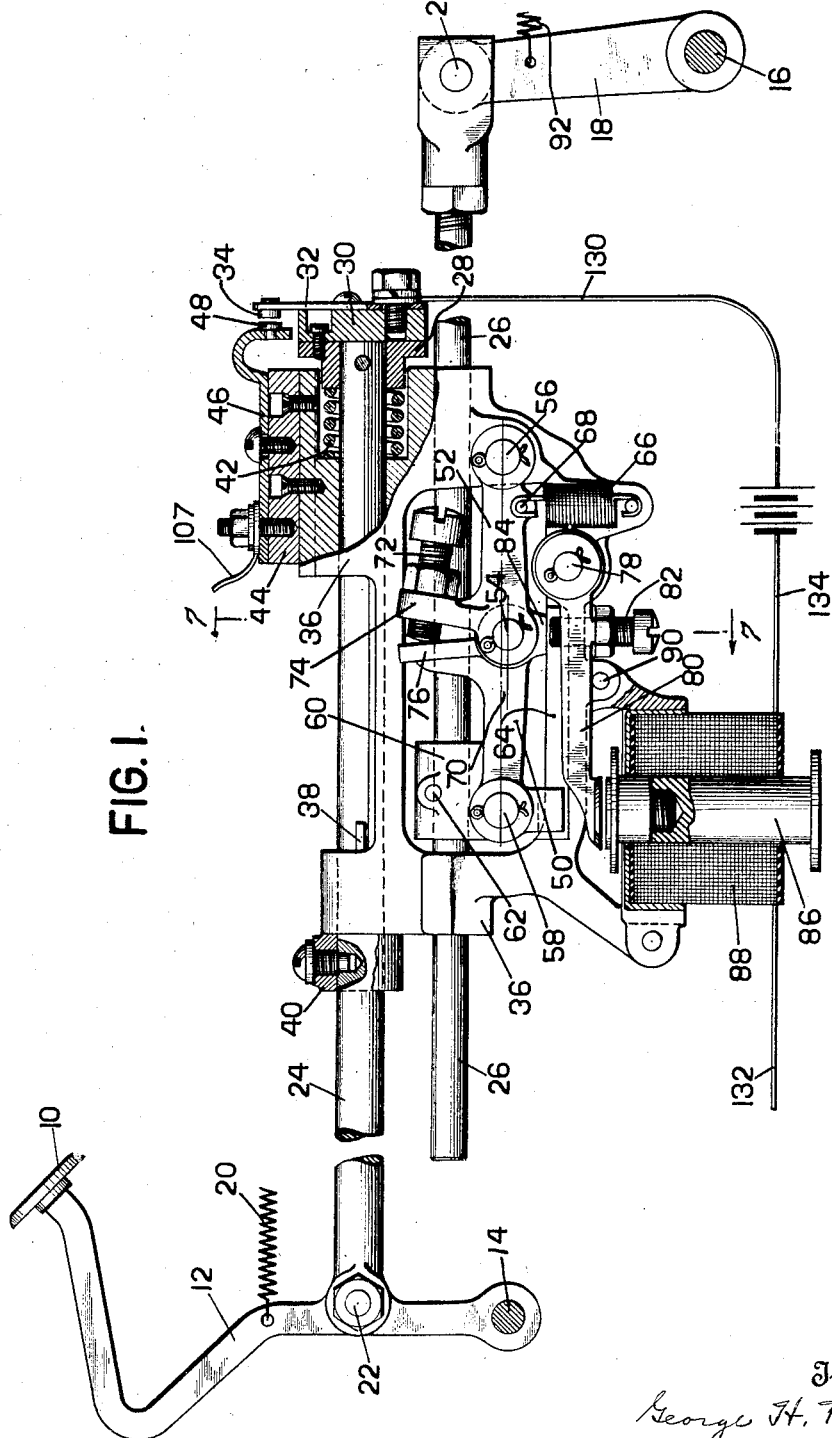
Inventor
George H. Taber
By his Attorney
Cooper, Kerr & Dunham

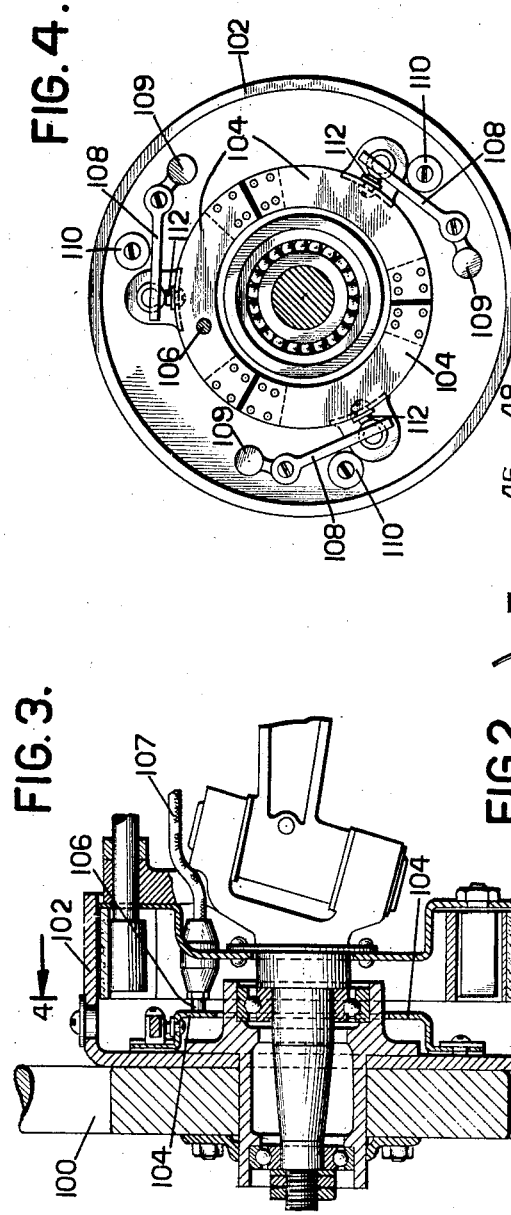
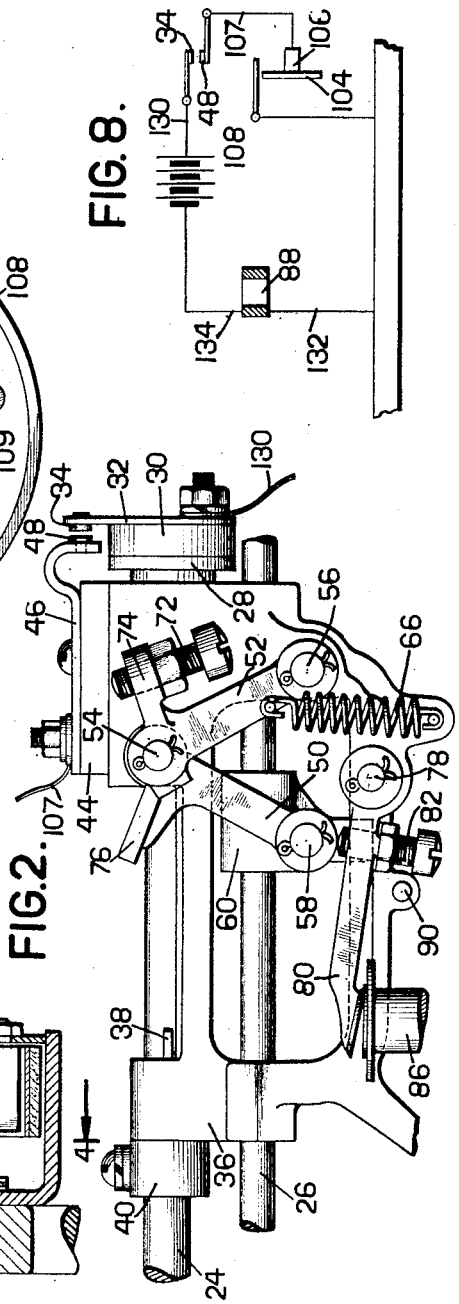

June 30, 1931.  G. H. TABER  1,812,502
BRAKE RELEASE DEVICE
Filed Aug. 16, 1928  3 Sheets-Sheet 3
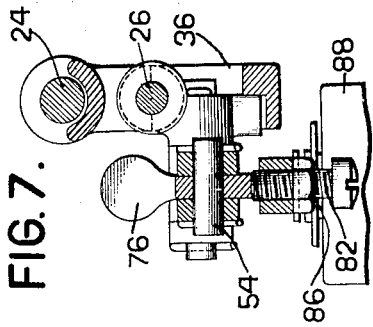
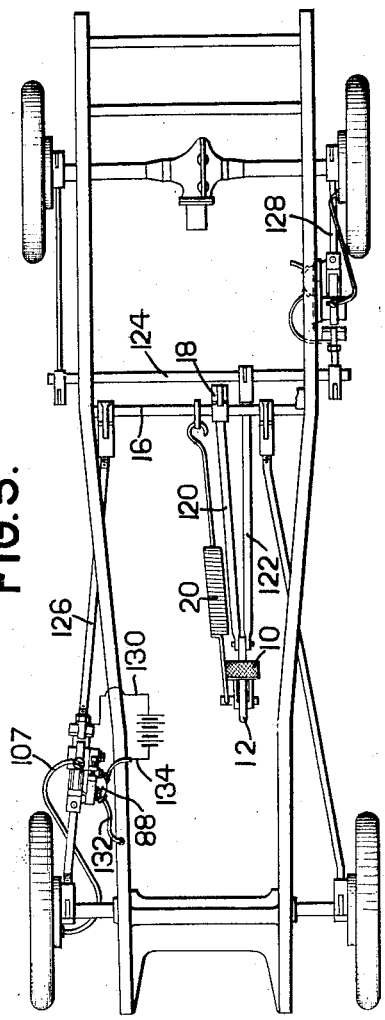
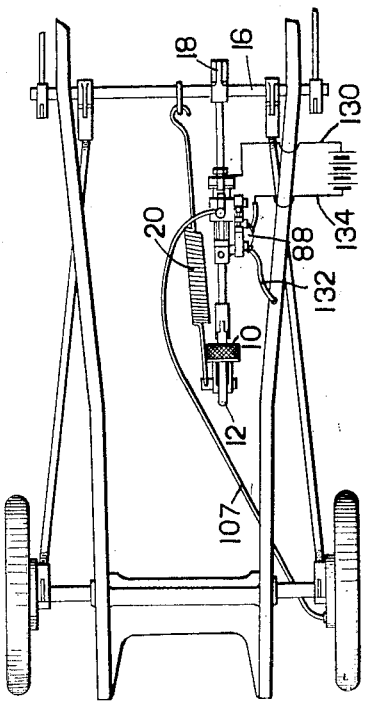
Inventor
George H. Taber
By his Attorney
Cooper, Kerr & Dunham Patented June 30, 1931

1,812,502

UNITED STATES PATENT OFFICE

GEORGE H. TABER, OF LOS ANGELES, CALIFORNIA

BRAKE RELEASE DEVICE

Application filed August 16, 1928. Serial No. 299,900.

This invention pertains to vehicle brakes, particularly four-wheel brakes used on automobiles.

Whenever the brakes are applied on a vehicle such as an automobile, which is operated on roads or streets and has no guiding means such as rails to guide it in a straight course, it is essential that the wheels be not locked to prevent them turning on their own axes, because when a wheel is locked against rotation it is useless as a means for guiding the vehicle, and skidding results.

This is true because when rolling action on the pavement ceases before the vehicle comes to rest the wheel will slide sidewise or in any other direction just as readily as it will slide forward and its direction of movement is therefore dependent upon the condition of the pavement surface, the slope of the surface, obstruction on the pavement, and so forth.

The above described condition provides a real danger to life and property when rubber tired automobiles are driven at high speed on wet pavements. Under such circumstances it is essential that rotation of the wheels be permitted until the vehicle is brought to rest, in order that the operator may retain control of its direction of travel until the car stops.

The principal object of the present invention is to provide a device which automatically releases a brake whenever the wheel to which the brake is applied stops rotating.

Another object is to provide means enabling the operator to immediately re-apply the brake after it has been automatically released.

Further and other objects and advantages will be hereinafter set forth in the accompanying specification and claims, and shown in the drawings, which by way of illustration show what is now considered to be the preferred embodiment of the invention.

Fig. 1 is a view of the complete device including brake pedal at the left and brake operating arm at the right.

Fig. 2 is a detail view of a portion of Fig. 1 showing the toggle mechanism in released position.

Fig. 3 is a section view of a front wheel and brake mechanism with my invention applied.

Fig. 4 is a sectional view, on the line 4—4 of Fig. 3.

Fig. 5 is a diagrammatic view of my invention applied to the right front and left rear wheels of an automobile.

Fig. 6 is a diagrammatic view of my invention arranged to be effective on both front wheels of an automobile.

Fig. 7 is a cross-section, on the line 7—7 of Fig. 1.

Fig. 8 is a circuit diagram.

Referring to Fig. 1, 10 is the brake pedal on the upper end of lever 12 which is fulcrumed on the frame at 14. 16 is a cross shaft mounted for rotation on the vehicle frame. Fast to shaft 16 is the upwardly extending arm 18. Spring 20 serves to urge lever 12 constantly toward the right. Pivotally connected to lever 12 at 22 is an upper brake rod 24.

Underneath rod 24 and parallel thereto is a somewhat similar rod 26, the right hand end of which is connected by a pin joint 28 to the upper end of arm 18.

In usual practice pins 22 and 28 are interconnected by a single rod and are therefore maintained at a fixed distance apart, but for the purpose of the present invention I provide a device, which will now be described, for varying that distance. In effect the device functions to operatively and automatically disconnect brake arm 18 from foot lever 12 whenever wheel rotation ceases, and then functions automatically to operatively re-connect the parts if the brake lever is released.

On the free end of rod 24 is pinned a flanged collar 28, to the flange of which is fastened an insulating block 30. To block 30 is secured a metallic strip 32 having at its free end an electric contact point 34. Mounted slidably on rod 24 is a crosshead member 36, which is prevented from turning on rod 24 by key 38. Fast on rod 24 is a collar 40 which serves as a stop to limit the travel of crosshead 36 to the left, in which direction it is constantly urged by compression spring 42, which surrounds rod 24, one end of the spring seating against collar 28 and the other against crosshead 36. On the upper side of the crosshead is attached an insulating block 44 on which is mounted a metallic strip 46 bearing at its free end a contact point 48. When foot lever 12 is moved to the left the initial movement thereof compresses spring 42 until the flange of collar 28 abuts against the end of crosshead 36, thus closing contacts 34—48 and keeping them closed so long as the foot lever is depressed. The utility of this arrangement will later appear.

Rod 26 passes through crosshead 36 from end to end and is operatively connected thereto by a toggle comprising links 50 and 52, joined by pin 54. The outer end of link 52 is hinged by pin 56 to crosshead 36, while the outer end of link 50 is connected by pin 58 to block 60 which is rigidly attached by pin 62 to rod 26. The lower edge of block 60 is bifurcated to straddle a guide portion 64 of the crosshead.

With foot lever 12 in normal position there is no strain on the above described parts and the toggle is drawn to, and retained in, its normal position as in Fig. 1 by spring 66, the lower end of which is attached to the crosshead, the upper end being attached to link 52 by a pin 68.

In normal position the center of toggle pin 54 is below a line through the centers of pins 56 and 58 a distance 70. This distance may be adjusted by means of a set screw 72 which passes through arm 74 of link 52 and abuts against a similar arm 76 on link 50.

Fulcrumed on pin 78 set into the lower part of crosshead 36 is a horizontal lever 80. This lever is provided with an adjustable screw 82 so placed as to be able to contact with a boss 84 on the under side of toggle link 52. The free end of lever 80 is positioned above the upper end of the vertical plunger 86 of solenoid 88, being held at proper distance therefrom by stop pin 90 upon which lever 80 rests.

When solenoid 88 is energized, plunger 86 rises, forcing the upper end of screw 82 against boss 84 of link 52 to force pin 54 above the center line of the toggle links. If at that time the brake pedal is depressed, and rods 24 and 26 being in tension, the toggle will break. Arm 24 will remain in the position to which it has been moved by the foot lever, but the toggle will assume the position shown in Fig. 2, permitting rod 26 to move to the right under the action of the brake releasing springs such as spring 92 attached to arm 18, thereby releasing the brake. When foot lever 12 is released, spring 66 will straighten the toggle again as in Fig. 1, thus restoring the parts to normal position. At the same time contact 34—48 is broken and the solenoid deenergized.

I shall now describe how the above mentioned releasing operation is brought about automatically while the automobile is in use.

Referring to Figs. 3 and 4, 100 represents the front wheel of an automobile, while 102 is the brake drum attached thereto. Attached to the inside of the drum but insulated therefrom is a disk-like member 104. Against the face of 104, near the top thereof, is a stationary brush 106 from which an insulated wire 107 leads to plate 46. Member 104 is not a continuous ring, but is broken at three points as indicated in Fig. 4 so that only the upper sector of 104 is electrically connected to brush 106. The joints between the sectors are filled with insulating material in order that a smooth path be provided for brush 106.

Pivotally attached to the brake drum are three contact levers 108, one associated with each sector of 104. Each lever has a counterweight 109 by which the effective centrifugal force may be adjusted. While the brake drum is revolving levers 108 are held by centrifugal force against rubber stops 110, and therefore out of contact with buttons 112 on the sectors. However, as soon as the drum stops revolving the upper lever 108 will fall by gravity onto its button 112 and contact will be closed therewith. Inasmuch as brush 106 is in contact only with the upper sector 104, no circuit can be set up through any lever 108 except the upper one. This is done in order to prevent inadvertent action of the device if the car is being rapidly decelerated. Under such a condition the momentum of one of the lower arms 108 might make contact and operate the device before the wheel had stopped rotating and thus defeat the purpose of the invention.

Figs. 5 and 6 are diagrammatic views showing different applications of my invention. In Fig. 5 one device is applied to the right front wheel and another device to the left rear wheel. By such an arrangement the driver of the car is always sure of one front wheel rotating so as to give him control over the steering of the car, and he is sure of one rear wheel rotating and thus tending to prevent skidding of the rear of the car.

In Fig. 6 the device is effective to release both front wheels if the left front wheel stops rotating. In Fig. 6 a single releasing device, associated with the foot lever as shown in Fig. 1, serves to operate on either one or two front wheels. In Fig. 5 the foot lever 12 is connected to the front brake system by a link 120, and to the rear system by a link 122 which serves to rock shaft 124. In this arrangement the releasing device is inserted in the front pull rod 126 and rear pull rod 128 as will readily be understood without further explanation.

The electric circuits may be traced by the aid of diagram, Fig. 8. When the brake pedal is depressed its initial movement closes contacts 34—48. Then if the wheel stops rotating arm 108 contacts with disk 104 and current flows as follows: from source, such as a battery, through wire 130, contacts 34—48, wire 107, brush 106, disk 104, arm 108 which is grounded on the frame, wire 132, solenoid 88, and wire 134 back to source. While this circuit is closed the toggle is broken and the brake cannot be applied. By releasing the pedal the circuit is broken at 34—48, solenoid 88 is deenergized, the toggle resumes its normal straight line position, and the parts are then in position to apply the brake again.

It is to be understood that the invention is not limited to the construction herein specifically illustrated but can be embodied in other forms without departure from its spirit as defined by the following claims.

I claim—

1. In braking apparatus for a rotating wheel, in combination, a brake, means for applying said brake to decelerate the rotation of the wheel, an electrical device, and means operable automatically to energize said electrical device in case the wheel ceases to rotate, whereby said device disables said applying device and releases said brake, substantially as described.

2. In braking apparatus for a rotating wheel, in combination, a brake, means for applying said brake to decelerate the rotation of the wheel, an electrical device, a contact device, means operable automatically to hold said contact device open while the wheel is rotating and to close said contact automatically to energize said electrical device in case the wheel ceases to rotate, whereby said device disables said applying device and releases said brake, substantially as described.

3. The invention as set forth in claim 2, in which said contact device is held open by centrifugal force while the wheel is rotating.

4. In apparatus of the class described, in combination, a wheel, a brake on said wheel, a force transmitting member, means for applying force to said member to apply said brake to decelerate rotation of said wheel, and a device in said member for automatically rendering said member ineffective for transmitting force in case the rotation of said wheel ceases while said force is being applied.

5. In apparatus of the class described, in combination, a wheel, a brake on said wheel, a force transmitting member, means for applying force to said member to apply said brake to decelerate rotation of said wheel, a toggle joint in said member, and a device operable automatically on said toggle joint for rendering said member ineffective for transmitting force in case the rotation of said wheel ceases while said force is being applied.

6. In apparatus of the class described, in combination, a wheel, a brake on said wheel, a depressible foot lever, a force transmitting member operatively connecting said foot lever and said brake whereby when said lever is depressed the brake is applied to decelerate rotation of said wheel, means operable automatically to render said member ineffective for transmitting force in case said wheel ceases rotation while said foot lever is depressed, and means operable automatically to again render said member effective when said foot lever returns to normal position.

In testimony whereof I hereto affix my signature.

GEORGE H. TABER.